United States Patent [19]

Welter

[11] Patent Number: 4,749,437
[45] Date of Patent: Jun. 7, 1988

[54] VARIABLY-WEIGHTED ULTRASONIC WELDING HORN

[75] Inventor: Curtis L. Welter, West Haven, Conn.
[73] Assignee: American Technology, Inc., Milford, Conn.
[21] Appl. No.: 34,613
[22] Filed: Apr. 6, 1987
[51] Int. Cl.⁴ .................................................. B23R 5/20
[52] U.S. Cl. ................................. 156/580.1; 228/1.1
[58] Field of Search .................. 156/73.1, 580.1, 580.2; 228/1.1

[56] References Cited

U.S. PATENT DOCUMENTS

| | | | |
|---|---|---|---|
| 3,053,124 | 9/1962 | Balamuth et al. | 228/56.2 |
| 3,328,610 | 7/1964 | Jacke et al. | 310/325 |
| 3,444,612 | 5/1969 | Pennings | 228/1.1 |
| 3,602,421 | 8/1971 | Spratt | 228/1 |
| 4,363,992 | 12/1982 | Holze | 310/323 |
| 4,529,473 | 7/1985 | Mims | 156/580.2 |
| 4,582,239 | 4/1986 | Scotto | 156/580.2 |
| 4,607,185 | 8/1986 | Elbert | 310/323 |

Primary Examiner—Donald E. Czaja
Assistant Examiner—J. Davis
Attorney, Agent, or Firm—Kramer, Brufsky & Cifelli

[57] ABSTRACT

Apparatus for the ultrasonic sealing of plastic or metal containers which include a source of ultrasonic wave energy, an ultrasonic welding horn and an anvil. The ultrasonic welding horn is provided with means to adjust and make uniform the amplitude of vibration of the wave energy transmitted by the horn. This is accomplished by attaching weights of varying magnitude to the horn, thus assuring a uniform amplitude of the ultrasonic vibration across the face of the worksurface of the horn, to effect a uniform bond on a workpiece.

7 Claims, 1 Drawing Sheet

VARIABLY-WEIGHTED ULTRASONIC WELDING HORN

BACKGROUND OF THE INVENTION

1. Field of Invention:

This invention relates to an ultrasonic welding horn provided with variable weights which can be removed and added to the horn in order to achieve a uniform distribution of the amplitude of ultrasonic vibration across the face of the worksurface of the horn.

2. Description of the Prior Art:

Ultrasonic welding may be used for several purposes, including the joining of metals or plastics. Ultrasonic welding is often used in applications where high temperatures would be impractical, such as in connecting fine wires to microchips, sealing plastic bags and hermetically closing toothpaste or similar tubes. The application of a high frequency of vibration is used in place of the application of heat causing the intermolecular bonding of overlapping worksurfaces.

In applications where a broad area must be welded, as in the aforementioned examples of sealing a plastic bag or the rolled end of a toothpaste-like tube, care must be taken to provide a uniform weld lest any portion of the welded area not adhere to itself, thus frustrating an aesthetic and hermetic seal.

In order to obtain uniform amplitude of vibration in the ultrasonic welding horn, it was recognized that the welding horn should be balanced so that its wave energy is distributed uniformly in its attachment to a sound wave booster or amplifier which in turn is connected to the source of ultrasonic energy. This has been accomplished in the prior art by carefully machining the horn to achieve the balance. More precisely, it was normal practice to cut grooves in the input side of the horn in order to remove whatever material necessary to achieve such a balance. Such a process is expensive and does not allow for later adjustment.

SUMMARY OF THE INVENTION

In accordance with the present invention, an ultrasonic welding horn is provided which has provision for the attachment of variable weights in order to assure a uniform distribution of amplitude of vibration and a resultant uniform bond in an ultrasonic welding application.

The welding horn has a worksurface which is large, thereby being well suited for sealing plastic bags or tubes such as toothpaste and other similar products which are packaged. Ultrasonic energy is transmitted to the horn from an ultrasonic generator and energy converter which is attached directly or indirectly through a booster to the input surface of the welding horn. This input surface is opposite from the worksurface and variable sized weights can be secured to either or both sides of the horn where it is attached to the ultrasonic energy converter and/or booster. Adjustment of the magnitude and position of these weights allows the operator to fine-tune the distribution of the amplitude of vibration across the worksurface of the welding horn thereby assuring a uniform weld across the workpiece.

BRIEF DESCRIPTION OF THE DRAWINGS

Further objects and advantages of the invention will become apparent from the following description and claims and from the accompanying drawings, wherein:

DETAILED DESCRIPTION OF THE PREFERRED EMBODIMENT

Figure 1:
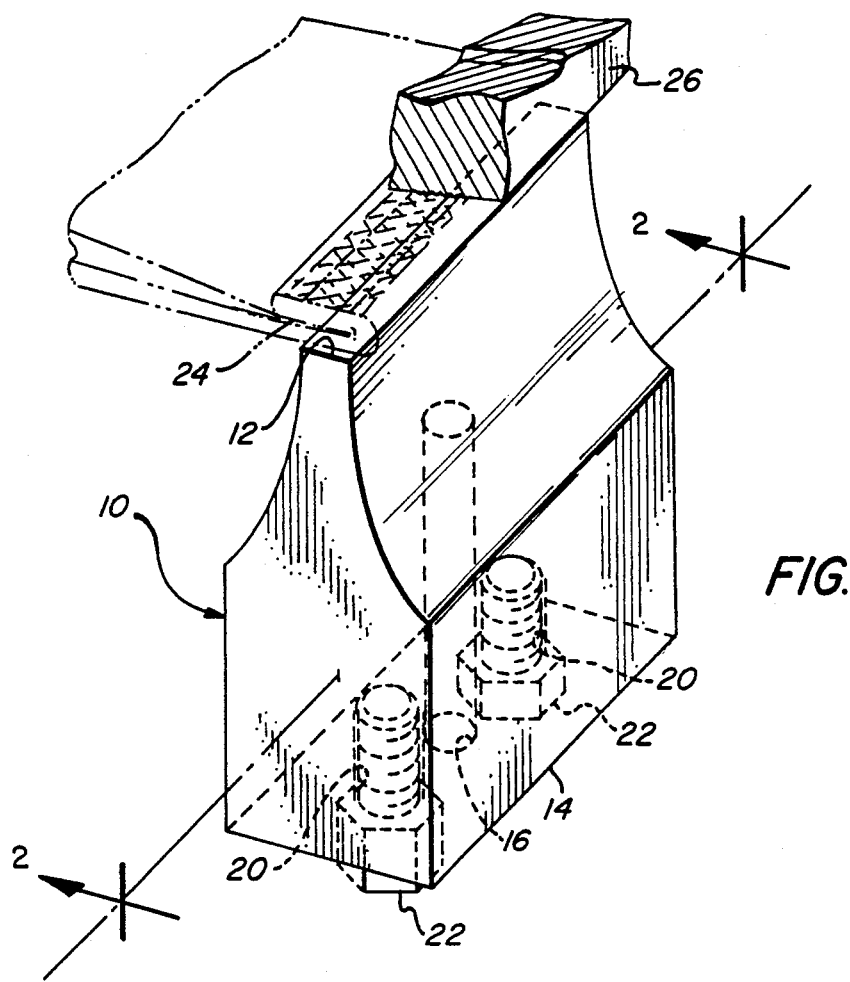
FIG. 1 is a perspective view of the welding horn of the invention, in position against a workpiece and an anvil.
Figure 2:
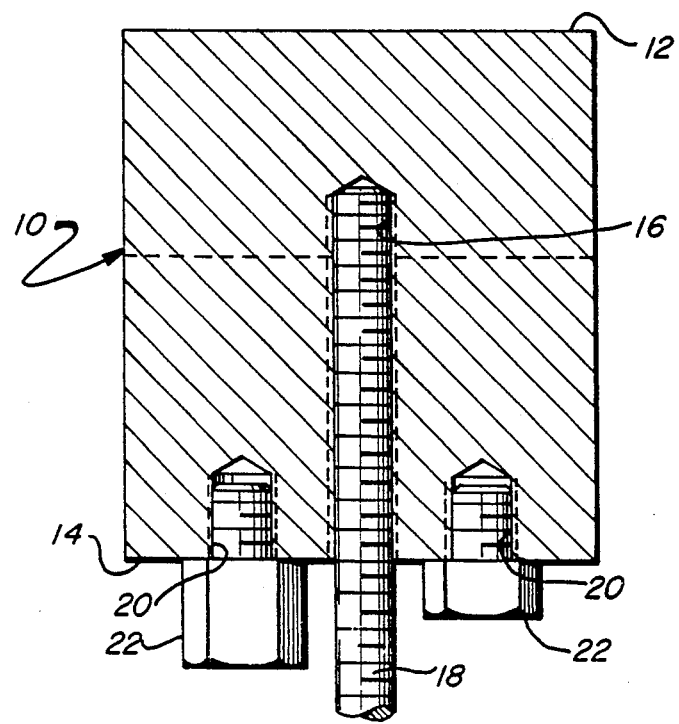
FIG. 2 is a cross-sectional view of the welding horn taken substantially along the plane indicated by line 2—2 of FIG. 1.

Referring now to the drawing in detail wherein like numerals indicate like elements throughout the several views, the welding horn 10 of the present invention has a long and narrow worksurface 12.

Opposite from and parallel to this worksurface 12 is an input surface 14. In the center of the input surface 14 is a threaded bore 16 into which a driving shaft 18 is threadedly inserted perpendicularly to the input surface 14. Ultrasonic vibration is transmitted from an external energy source (not shown) to the welding tip 10 through the driving shaft 18.

On either side of the threaded bore 16 and longitudinal axis of the welding tip 10, is a threaded hole 20 whose longitudinal axis is parallel to the longitudinal axis of the threaded bore 16. Balancing weights 22 can be adjustably screwed into one or both of the threaded bores 20. The magnitude of the balancing weights 22 may be chosen or adjusted so as to assure that the ultrasonic vibrations have a uniform distribution of amplitude across the face of the worksurface 12.

A workpiece 24 to be welded or sealed is held between the welding horn 10 and a backing anvil 26. Welding is effected by ultrasonic vibrations being transmitted through the driving shaft 18 to the welding horn 10.

What is claimed is:

1. In an ultrasonic welding device:
   an ultrasonic wave energy generator,
   a welding horn in communication with said ultrasonic generator,
   a worksurface on said welding horn, and
   an anvil positioned opposite from said worksurface such that a workpiece to be ultrasonically sealed may be placed therebetween,
   the improvement comprising:
   adjustably positioned weight means secured to said welding horn for adjusting the amplitude of vibration of said welding horn to obtain a uniform vibration across the face of said worksurface.

2. In the device of claim 1, said weight means including:
   threadable connection means for adjustably positioning said weight means to adjust the amplitude of vibration at the worksurface.

3. In the device of claim 2, said weight means including:
   at least one weight attached by said threadable connection means to said welding horn.

4. An ultrasonic welding horn comprising:
   a worksurface having a face adapted to contact and vibrate a workpiece to bond the workpiece; and
   adjustably positioned weight means connected to a surface of said horn opposite to said worksurface whereby selective positioning of said weight means adjusts the amplitude of vibration of said welding horn to obtain uniform vibration across the face of said worksurface.

5. The horn of claim 4 wherein said weight means includes threadable connection means for adjustably positioning said weight means to adjust the amplitude of vibration at the worksurface.

6. The horn of claim 5 wherein said weight means includes more than one weight, each weight being of different magnitude.

7. The horn of claim 5 wherein said weight means includes at least one weight on either side of the longitudinal axis through said horn.

* * * * *